Patented Apr. 11, 1939

2,153,956

UNITED STATES PATENT OFFICE 2,153,956

AGE RESISTOR

Albert M. Clifford, Cuyahoga Falls, Ohio, assignor to Wingfoot Corporation, Akron, Ohio, a corporation of Delaware No Drawing. Application May 5, 1933,
Serial No. 669,562

18 Claims. (Cl. 18—50)

This invention relates to the retarding of the ageing of deterioratable organic compositions; more particularly, to the use in rubber, balata, gutta-percha, transformer oils, gasoline and other deterioratable compositions of age retarders or antioxidants of the kind hereinafter set forth. The substances to which the invention relates have been found to protect against deterioration from such influences as heat, light and oxygen. They have also been found in the case of rubber to materially enhance the resistance to deterioration by flexing. In general, they accomplish various desirable ends, among them, in the case of rubber, that of imparting improved tensile strength to the treated product and, in the case of gasoline, of preventing the formation of gums and gummy materials.

Substances which may be employed as antioxidants in accordance with the teaching of the present invention are reaction products of quinones and amines and may be represented by the type formula $R(X)_2$, wherein R is an ortho or para benzoquinoid or a naphthoquinoid structure. The two substituents designated by X are attached to the quinoid grouping at the two double bonds. They may be like or unlike and represent either oxygen or an imino grouping. R may be, if desired, substituted by such radicals as hydroxy, amino, alkyl amino, aryl amino, alkyl aryl amino, alicyclic amino, aryl or alkyl nitrosamino, hydroxy aryl, halogen aryl, alkyl, halogen, aryl, aryloxy, aralkoxy and alkoxy groups. Similarly, when X is an imino grouping, it may be either =NH or =NR₁, R₁ being aryl or alkyl.

Although it is to be understood that the invention is not limited thereby, it may be stated that compounds containing either an OH group or an =N—H group or both, generally exhibit stronger age-retarding action than compounds not so constituted. Thus for most purposes the compounds 2-anilino 4-phenyl imino 1-naphthoquinone

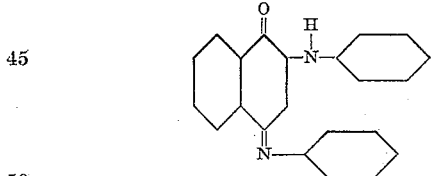

2-hydroxy 4-phenyl imino 1-naphthoquinone

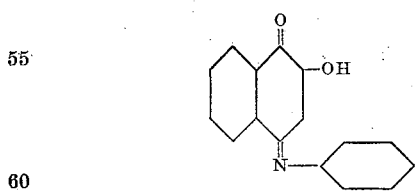

2 anilino 1-4 benzoquinone

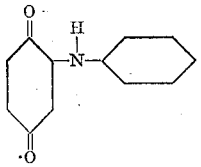

and the like are even stronger age-resistors than compounds such as 2-5 di (dimethylamino) 1-4 benzoquinone

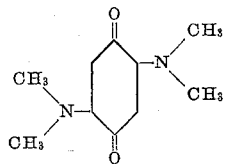

The latter is, however, suitable for use as an age retarder pursuant to the teachings of the present invention.

Examples of other compounds falling within the scope of the invention are 2-hydroxy 4-para tolyl imino 1-naphthoquinone

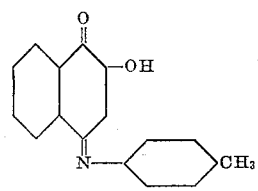

2-hydroxy 4-para hydroxy phenyl imino 1-naphthoquinone, 1-imino 2-hydroxy 4 o-anisyl imino naphthoquinone

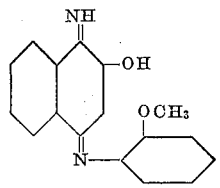

2-para tolyl amino 4-para tolyl imino 1-naphthoquinone, 1-imino 2-hydroxy 4-para chlor phenyl imino naphthoquinone, 1-imino 2-hydroxy 4-para amino phenyl imino naphthoquinone

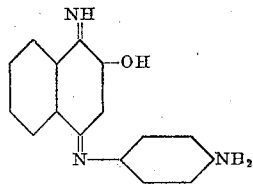

1-imino 2-hydroxy 4-phenyl imino naphthoquinone, 1-imino 2-hydroxy 4-para toluyl imino naphthoquinone.

Other compounds falling within the scope of the invention are, for example, 4-aryl amino 1-aryl imino 2-naphthoquinones, such as 4-phenyl amino 1-phenyl imino 2-naphthoquinone

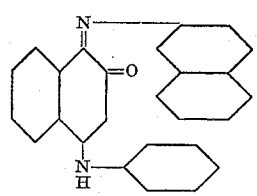

4-phenyl amino 1-naphthyl imino 2-naphthoquinone

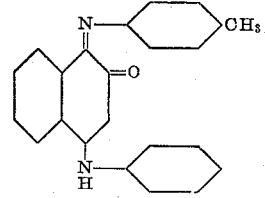

4-ortho toluyl amino 1-ortho toluyl imino 2-naphthoquinone, 4-para chlor phenyl amino 1-para chlor phenyl imino 2-naphthoquinone, 4-naphthylamino 1-phenyl imino 2-naphthoquinone and 4-phenyl amino 1-para toluyl imino 2-naphthoquinone

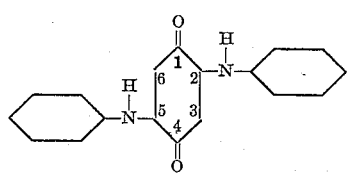

Others are 2-5 dianilino 1-4 benzoquinone

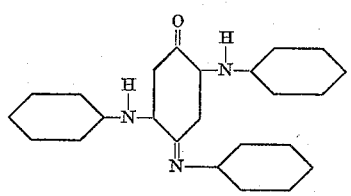

2-anilino 1-4 benzoquinone, 2-5 dianilino 4-phenyl imino 1-benzoquinone

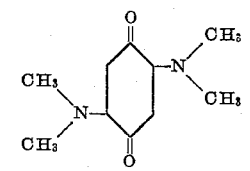

2-5 di (di methyl amino) 1-4 benzoquinone

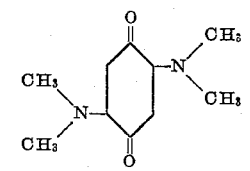

2-5 di (ortho nitro phenyl amino) 1-4 benzoquinone, 2-phenyl amino 5-alpha naphthylamino 1-4 benzoquinone

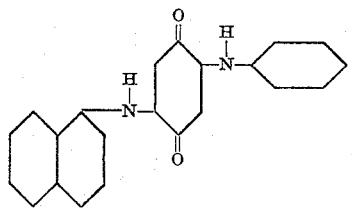

2-alpha naphthylamino 1-4 benzoquinone, 2-5 di (para chlor phenyl amino) 1-4 benzoquinone, 2-para chlor phenyl amino 1-4 benzoquinone, 2-methyl phenyl amino 1-4 benzoquinone

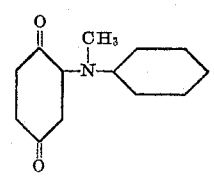

2-methyl phenyl amino 5-meta chlor anilino 1-4 benzoquinone, 2-methyl phenyl amino 5-alpha naphthylamino 1-4 benzoquinone, 2-phenyl benzyl amino 1-4 benzoquinone

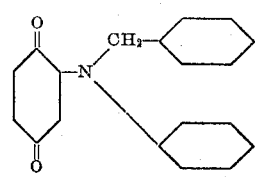

and 2-5 di (phenyl benzyl amino) 1-4 benzoquinone.

Still others are 2-ortho toluyl amino 1-4 benzoquinone, 2-5 di ortho toluyl amino 1-4 benzoquinone, 2-m-toluyl amino 1-4 benzoquinone, 2-5 di (m-toluyl amino) 1-4 benzoquinone, 2-p-phenetidyl 1-4 benzoquinone, 2 o-anisyl amino 1-4 benzoquinone

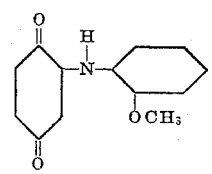

para chloro methyl anilino toluquinone

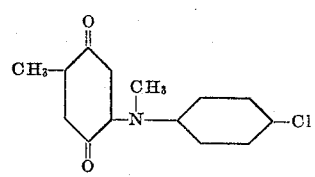

2-5 di piperidyl 1-4 benzoquinone

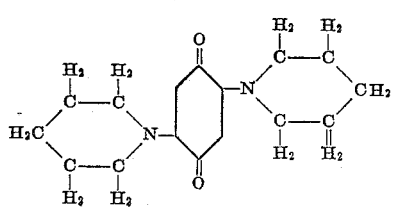

2-5 di (methyl amino) 1-4 benzoquinone, 2-5 bis (secondary butylamino) 1-4 benzoquinone

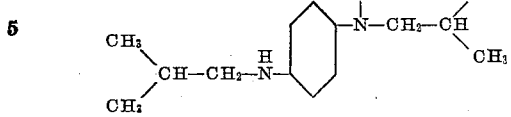

2-5 bis (amyl amino) 1-4 benzoquinone, and 2-5 bis (ethyl amino) 1-4 benzoquinone.

Also falling within the scope of the invention are 2-anilino 1-4 naphthoquinone

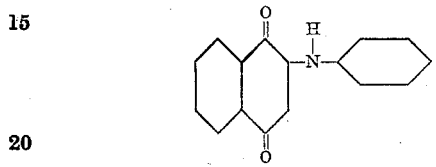

2-phenyl amino 4-phenyl imino 1-naphthoquinone, 2-p-brom anilino 1-4 naphthoquinone, 2-anilino 4-phenyl imino 1-benzoquinone, 2-para chlor anilino 4-para chlor phenyl imino 1-naphthoquinone, 2-o-toluyl amino 1-4 naphthoquinone, 2-anilino 7-8 di chlor 1-4 naphthoquinone

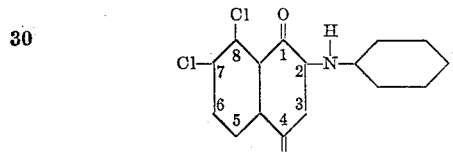

2-methyl amino 3-chlor 1-4 naphthoquinone, and 2-ethyl amino 3-chlor 1-4 naphthoquinone.

Methods for preparing this class of compounds will suggest themselves; for example, 1-4 anilino naphthoquinone 2-anil and 2-hydroxy 1-4 anilino naphthoquinone may be prepared as outlined in Berichte 27, 23 (1894), from alpha nitroso beta naphthol. In accordance with this method, alpha nitroso beta naphthol is converted into 1-amino 2-naphthol 4-sulfonic acid

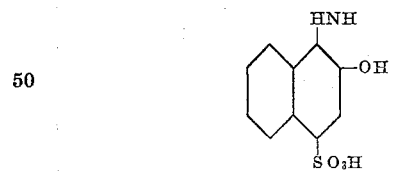

by treating it with a saturated solution of sodium bisulfite. This operation results in a simultaneous reduction of the nitroso group to an amino group, and the introduction of a sulfonic group in the 4-position of the naphthylene radical. The sulfonate thus formed may readily be oxidized by means of nitric acid to form 1-2 naphthoquinone 4-sulfonic acid

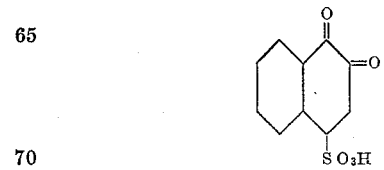

which upon being treated with potassium chloride forms a potassium salt. The potassium salt is then reacted in mol per mol ratio with aniline in aqueous solution, whereupon an anilino group is substituted for the sulfonate radical and 2-hydroxy 1-4 anilino naphthoquinone

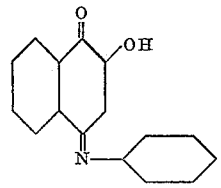

results. This compound is formed as a red precipitate, which upon being filtered from the reacting materials, gives a solid material having a melting point of about 240° C., a compound in relatively pure form. For most purposes it is unnecessary to subject it to further purification.

Similarly, if in the above reaction para toluidine is substituted for aniline, the compound 2-hydroxy 1-4 para toluidino naphthoquinone having the formula

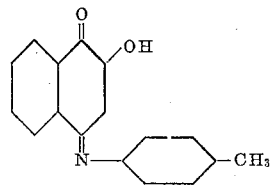

is obtained. Likewise, if para amino phenol is substituted for aniline, 2-hydroxy 1-4 para hydroxy anilino naphthoquinone is formed.

Also, if the potassium salt of 1-2 naphthoquinone 4-sulfonic acid is treated with two mols of aniline dissolved in acetic acid at about 120° C., 1-4 anilino naphthoquinone 2-anil

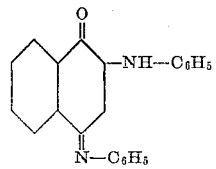

is formed. This compound is of red color and has a melting point of approximately 180° C. It is obtained from the original reaction in relatively pure form, being capable of use for most purposes without any further purification. Similarly 1-4-para toluidino naphthoquinone 2-para tolyl amine may be prepared by the interaction of 1-2 naphthoquinone 4-sulfonic acid with 2 mols of para toluidine.

1-amino 2-hydroxy 4-phenyl imino naphthoquinone may be prepared similarly by dissolving in 800 parts of water, 52 parts of 1-2-4 amino naphthol sulfonic acid, 14 parts of anhydrous sodium carbonate and 25 parts of aniline. The cold solution is agitated and oxidized by gradual addition of sodium hypochlorite or other oxidizing agent until there is an excess of chlorine and the precipitate no longer increases. The latter is drained and may be purified by solution in cold dilute caustic soda and immediate reprecipitation from the filtered solution by sodium bicarbonate. The 1-imino 2-hydroxy 4-phenyl imino naphthoquinone thus obtained crystallizes from alcohol in brilliant orange plates.

Another method of preparation is that outlined in the preparation of 2-5-diortho toluidino 1-4-benzoquinone. This compound is prepared by dissolving 32.4 grams of benzoquinone and 42.8 grams of ortho toluidine in separate portions of 75% cold ethyl alcohol. The two solutions are then mixed and after a brief period of agitation the mass is filtered and the precipitate washed with 50% ethyl alcohol. The product, 2,-5-di-ortho toluidino 1-4 benzoquinone, is obtained in the form of light brown crystals melting at 209–211° C.

In another embodiment of the invention, warm ethyl alcohol solutions of 21.6 grams of benzoquinone and 43.2 grams of para phenylene diamine are mixed and allowed to stand overnight. The mass is then filtered, the product being in the form of a brown powder melting between approximately 185–200° C. Although this crude reaction product itself is an excellent antioxidant for rubber, by further purifying it, an even better antioxidant may be obtained. One method of purification found to be applicable is to extract the brown precipitate twice with ethyl alcohol. The purified product melts at 193–205° C. The exact constitution of these benzoquinone-para phenylene diamine products is not yet known although it is believed that a mixture of compounds is formed.

The compound 2-5-dianilino 1-4-benzoquinone may be prepared by dissolving one mol of benzoquinone in water, alcohol or dilute acetic acid and adding two mols of aniline. The materials react readily at either room temperatures or slightly elevated temperatures to give the 2-5-dianilino 1-4-benzoquinone. Similarly, 2-phenyl amino 5-alpha naphthylamino 1-4-benzoquinone may be prepared by reacting two phenyl amino 1-4-benzoquinone and alpha naphthylamine. Still other methods which it is not necessary to describe in this application may be employed where circumstances permit, such methods being found in the literature of chemistry.

It is to be understood that the invention is not concerned with any specific method of preparing the antioxidants of the invention or, regardless of illustrative references herein, to the use thereof in rubber. The antioxidants of the invention may, however, be employed advantageously in substantially any of the standard rubber formulae, the following being one in which they have been found to give excellent results:

|  | Parts |
|---|---|
| Extracted pale crepe | 100 |
| Zinc oxide | 5 |
| Sulfur | 3 |
| Stearic acid | 1.5 |
| Hexamethylene tetramine | 1 |
| Antioxidant | 1 |

As pointed out above, they may also be employed in transformer oils, gasoline, etc.

Rubber samples prepared in accordance with the foregoing formula were subjected to vulcanization for varying periods of time and then tested to ascertain their physical characteristics. One set from each type of stock was tested immediately for tensile strength and elasticity, while a second set was subjected to ageing in a Bierer-Davis bomb for six days in oxygen at 50° C. and 150 pounds per square inch. At the conclusion of the 6-day period the samples were removed from the bomb and subjected to physical tests corresponding to those conducted upon the unaged samples.

It is evident from the following tables that rubber compositions containing even small proportions of the antioxidants of this invention resist deterioration remarkably well. Similarly, compositions not containing the antioxidants upon being subjected to corresponding tests increase in weight in the neighborhood of ten percent and lose almost all their tensile and elongation properties.

| Cure in mins. | Steam pressure, lbs. per sq. in. | Load in kgs/cm² at— | | | Percent elong. at break | Percent weight inc. |
|---|---|---|---|---|---|---|
| | | 500% elong. | 700% elong. | Break | | |
| 2-HYDROXY 4-PHENYL IMINO-1 NAPHTHOQUINONE | | | | | | |
| *Original* | | | | | | |
| 30 | 40 | 11 | 32 | 100 | 900 | |
| 50 | 40 | 17 | 54 | 135 | 865 | |
| 70 | 40 | 24 | 90 | 165 | 805 | |
| *After ageing* | | | | | | |
| 30 | 40 | 14 | 44 | 85 | 815 | .20 |
| 50 | 40 | 21 | 75 | 125 | 790 | .28 |
| 70 | 40 | 29 | 111 | 130 | 730 | .54 |
| 2-ANILINO 4-PHENYL IMINO-1-NAPHTHOQUINONE | | | | | | |
| *Original* | | | | | | |
| 30 | 40 | 13 | 43 | 110 | 875 | |
| 50 | 40 | 19 | 68 | 150 | 835 | |
| *After ageing* | | | | | | |
| 30 | 40 | 13 | 38 | 40 | 705 | .33 |
| 50 | 40 | 20 | 68 | 105 | 770 | .68 |
| 2-HYDROXY 4-PARA TOLYL IMINO 1-NAPHTHOQUINONE | | | | | | |
| *Original* | | | | | | |
| 35 | 40 | 13 | 36 | 91 | 870 | |
| 50 | 40 | 17 | 55 | 101 | 800 | |
| 70 | 40 | 23 | 86 | 139 | 775 | |
| *After ageing* | | | | | | |
| 35 | 40 | 15 | 46 | 91 | 820 | .14 |
| 50 | 40 | 20 | 64 | 118 | 795 | .28 |
| 70 | 40 | 28 | 104 | 128 | 725 | .30 |
| 2-PARA TOLYL AMINO-4-PARA TOLYL IMINO-1-NAPHTHOQUINONE | | | | | | |
| *Original* | | | | | | |
| 35 | 40 | 11 | 27 | 88 | 915 | |
| 50 | 40 | 16 | 47 | 100 | 825 | |
| 70 | 40 | 22 | 81 | 125 | 770 | |
| *After ageing* | | | | | | |
| 35 | 40 | 16 | 46 | 98 | 825 | .06 |
| 50 | 40 | 20 | 70 | 122 | 795 | .06 |
| 70 | 40 | 27 | 103 | 133 | 740 | .19 |
| 2-HYDROXY 4-PARA HYDROXY PHENYL IMINO 1-NAPHTHOQUINONE | | | | | | |
| *Original* | | | | | | |
| 35 | 40 | 12 | 33 | 82 | 875 | |
| 50 | 40 | 16 | 49 | 109 | 840 | |
| 70 | 40 | 24 | 83 | 133 | 780 | |
| *After ageing* | | | | | | |
| 35 | 40 | 16 | 48 | 108 | 840 | .01 |
| 50 | 40 | 19 | 64 | 121 | 810 | .03 |
| 70 | 40 | 26 | 96 | 129 | 745 | .05 |

Another rubber formula found to give excellent results with the antioxidants of this invention is the following:

| | Parts |
|---|---|
| Extracted pale crepe | 100 |
| Zinc oxide | 5 |
| Stearic acid | 1.5 |
| Sulfur | 3 |
| Hexamethylene tetramine | .5 |
| Antioxidant | 1 |

Using this formula, rubber samples prepared and tested as previously described, gave the following data:

| Cure in mins. | Steam pressure, lbs. per sq. in. | Load in kgs/cm² at— | | | Percent elong. at break | Percent weight inc. |
|---|---|---|---|---|---|---|
| | | 500% elong. | 700% elong. | Break | | |
| 2-5-DIORTHO TOLUIDINO 1-4-BENZOQUINONE | | | | | | |
| Original | | | | | | |
| 35 | 40 | 11 | 27 | 74 | 905 | |
| 50 | 40 | 16 | 44 | 87 | 835 | |
| 70 | 40 | 21 | 65 | 118 | 800 | |
| After ageing | | | | | | |
| 35 | 40 | 12 | 32 | 60 | 825 | .36 |
| 50 | 40 | 16 | 49 | 78 | 790 | .55 |
| 70 | 40 | 24 | 80 | 88 | 715 | .82 |
| CRUDE REACTION PRODUCT OF PARA PHENYLENE DIAMINE AND BENZOQUINONE | | | | | | |
| Original | | | | | | |
| 35 | 40 | 31 | 107 | 161 | 780 | |
| 50 | 40 | 41 | 143 | 166 | 730 | |
| 70 | 40 | 46 | 170 | 199 | 730 | |
| After ageing | | | | | | |
| 35 | 40 | 37 | 128 | 157 | 740 | .28 |
| 50 | 40 | 44 | 158 | 164 | 705 | .42 |
| 70 | 40 | 52 | ----- | 180 | 690 | .39 |
| PURIFIED REACTION PRODUCT OF P-PHENYLENE DIAMINE AND BENZOQUINONE | | | | | | |
| Original | | | | | | |
| 35 | 40 | 35 | 107 | 127 | 730 | |
| 50 | 40 | 34 | 117 | 182 | 775 | |
| 70 | 40 | 42 | 154 | 182 | 730 | |
| After ageing | | | | | | |
| 35 | 40 | 33 | 118 | 166 | 765 | .20 |
| 50 | 40 | 44 | 156 | 156 | 700 | .26 |
| 70 | 40 | 50 | ----- | 170 | 685 | .34 |

From the foregoing it is evident that the compounds herein disclosed are highly suitable as age resistors of rubber and other organic products which undergo deterioration under the influence of heat, light and oxygen. Not only do the compounds of the present invention counteract the effects of such influences, but they tend to impart other highly desirable qualities, such for example as increased resistance to deterioration by flexing.

This application is in part a continuation of copending application Serial No. 455,472, filed May 24, 1930, and copending application Serial No. 284,886, filed June 12, 1928.

It is to be understood that as hereinafter used the term "benzenoid" embraces phenyl and naphthyl groups, which, as preferred, do or do not contain substituents, such substituents being, for example, alkoxy, alkyl, hydroxy, amino and like groups. Also by the term "rubber" it is meant to include rubber, latex, balata, gutta-percha, guayule, rubber isomers, rubber conversion products and similar materials. It will be apparent that numerous changes may be made in the procedure to be followed and the chemicals employed without departing from the inventive concept. It is intended that the patent shall cover, by suitable expression in the appended claims, whatever features of patentable novelty reside in the invention.

What is claimed is:

1. A method of treating vulcanizable rubber compounds which comprises subjecting them to vulcanization in the presence of anilino phenyl imino naphthoquinone.

2. A method of treating vulcanizable rubber compounds which comprises subjecting them to vulcanization in the presence of 2-anilino 4-phenyl imino 1-naphthoquinone.

3. A rubber product that has been vulcanized in the presence of a material having the following structural formula:

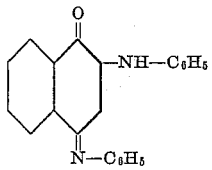

4. A method of treating rubber which comprises subjecting a vulcanizable rubber compound to vulcanization in the presence of 2-hydroxy anilino naphthoquinone.

5. A method of treating vulcanizable rubber compounds which comprises subjecting them to vulcanization in the presence of 2-hydroxy 4-phenyl imino 1-naphthoquinone.

6. A rubber product that has been vulcanized in the presence of a material having the following structural formula:

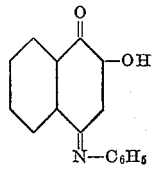

7. A method of treating a vulcanizable rubber composition which comprises subjecting it to vulcanization in the presence of a quinone of the benzene and naphthalene series containing at least one imino substituent.

8. A method of treating a vulcanizable rubber composition which comprises subjecting it to vulcanization in the presence of a naphthoquinone containing at least one trivalent nitrogen substituent.

9. A method of treating a vulcanizable rubber composition which comprises subjecting it to vulcanization in the presence of a naphthoquinone containing at least one trivalent nitrogen substituent and at least one hydroxy substituent.

10. A method of treating a vulcanizable rubber composition which comprises subjecting it to vulcanization in the presence of a naphthoquinone containing at least one aromatic trivalent nitrogen substituent.

11. A method of treating vulcanizable rubber compounds which comprises subjecting them to vulcanization in the presence of a reaction product formed by reacting 1-2-naphthoquinone 4-sulfonic acid and aniline in the approximate proportion of at least one and not more than two mols of amine to one mol of quinone compound.

12. A rubber product which has been vulcanized in the presence of a reaction product formed by reacting 1-2-naphthoquinone 4-sulfonic acid and aniline in the approximate proportion of at least one and not more than two mols of amine to one mol of quinone compound.

13. A rubber product which has been vulcanized in the presence of a material having the following structural formula

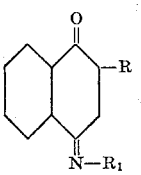

in which R represents an aryl amino group of the benzene and naphthalene series or a hydroxyl group and R' represents an aromatic radical.

14. A method of preserving rubber which comprises incorporating therein a reaction product of a primary amine and a material having the formula

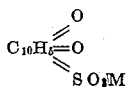

in which M is an alkali metal, in the approximate proportion of at least one and not more than two mols of amine to one mol of the quinone compound.

15. Rubber having incorporated therein a quinone imine of the benzene and naphthalene series.

16. A method of treating a vulcanizable rubber composition which comprises subjecting it to vulcanization in the presence of a 2-4-substituted 1-naphthoquinoid compound in which the three indicated substituted positions are severally occupied by a bivalent oxygen atom, an imino group and an amino group.

17. A method of treating a vulcanizable rubber composition which comprises subjecting it to vulcanization in the presence of a 2-aryl amino-4-aryl imino-1-naphthoquinone.

18. A method of treating a vulcanizable rubber composition which comprises subjecting it to vulcanization in the presence of a 2-4-substituted-1-naphthoquinone in which the 2- and 4- positions are severally occupied by an imino group and an amino group.

ALBERT M. CLIFFORD.